United States Patent
Mei et al.

(10) Patent No.: US 8,766,612 B2
(45) Date of Patent: Jul. 1, 2014

(54) ERROR AMPLIFIER WITH BUILT-IN OVER VOLTAGE PROTECTION FOR SWITCHED-MODE POWER SUPPLY CONTROLLER

(75) Inventors: Tawen Mei, Sunnyvale, CA (US); Zheng Li, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 534 days.

(21) Appl. No.: 13/082,138

(22) Filed: Apr. 7, 2011

(65) Prior Publication Data

US 2012/0256609 A1    Oct. 11, 2012

(51) Int. Cl.
*G05F 1/575* (2006.01)

(52) U.S. Cl.
USPC ........................................... 323/282

(58) Field of Classification Search
USPC ........................................... 323/282
See application file for complete search history.

(56) References Cited

U.S. PATENT DOCUMENTS

| | | | |
|---|---|---|---|
| 5,889,393 A * | 3/1999 | Wrathall | 323/282 |
| 6,909,268 B2 * | 6/2005 | Taghizadeh-Kaschani | 323/284 |
| 6,975,099 B2 | 12/2005 | Wu et al. | |
| 7,012,411 B2 * | 3/2006 | Yasukouchi | 323/282 |
| 7,218,083 B2 | 5/2007 | Wang et al. | |
| 7,253,593 B1 * | 8/2007 | Chen et al. | 323/224 |
| 7,368,896 B2 | 5/2008 | Nagata et al. | |
| 7,583,138 B1 | 9/2009 | DeStasi et al. | |
| 7,589,517 B1 * | 9/2009 | Broach et al. | 324/117 R |
| 7,733,671 B2 * | 6/2010 | Chen et al. | 363/21.04 |
| 7,772,817 B2 | 8/2010 | Takagi et al. | |
| 7,863,875 B1 | 1/2011 | Guo et al. | |
| 8,552,700 B2 * | 10/2013 | Dao et al. | 323/282 |
| 2008/0111530 A1 * | 5/2008 | Hasegawa et al. | 323/284 |
| 2010/0301827 A1 * | 12/2010 | Chen et al. | 323/299 |
| 2011/0001458 A1 | 1/2011 | Bansal et al. | |
| 2011/0156688 A1 * | 6/2011 | Lin et al. | 323/282 |
| 2011/0316508 A1 * | 12/2011 | Cheng et al. | 323/282 |
| 2012/0256609 A1 * | 10/2012 | Mei et al. | 323/282 |
| 2012/0280669 A1 * | 11/2012 | Li et al. | 323/284 |

\* cited by examiner

*Primary Examiner* — Jeffrey Sterrett
(74) *Attorney, Agent, or Firm* — Andrew Viger; Frederick J. Telecky, Jr.

(57) ABSTRACT

An error amplifier includes a first amplification circuit with a reference signal input and a feedback signal input representing the amplitude of a load voltage of a switched mode power supply. The error amplifier includes a difference amplifier providing a difference signal representing a difference between the reference signal and the feedback signal, provided for determining the duty cycle of a switching signal in the switched mode power supply. The first amplification circuit further includes a control circuit providing a control signal generated as a function of the difference between the reference signal and the feedback signal.

The error amplifier also includes a second amplification circuit, included in a compensation circuit. The second amplification circuit receives the control signal, and the operating current of the second amplification circuit is adjusted by an amount indicated by the control signal.

24 Claims, 5 Drawing Sheets

ERROR AMPLIFIER WITH BUILT-IN OVER VOLTAGE PROTECTION FOR SWITCHED-MODE POWER SUPPLY CONTROLLER

BACKGROUND

A power supply is generally expected to provide a constant source of power when enabled and is often further expected to withstand and recover from transients or from stress conditions occurring at the output of the power supply. For example, a power supply may withstand various overload conditions and may include over-voltage, over-current, and over-temperature protection.

A power supply may have a regulated output voltage, wherein the output voltage is generally maintained within certain limits of a regulation specification. A limitation mechanism may be included in the power supply to limit the rate of change of the output voltage.

Following the end of an overload condition the output voltage may quickly rise and exceed the regulation limits. Although the power supply may attempt to bring the output voltage back within the regulation limits quickly, the limitation mechanism may limit the rate of change of the output. Thus, the amount of time the output voltage remains in excess of the regulation limits is extended.

Additionally, if the output voltage exceeds an over-voltage threshold following the end of the overload condition, an over-voltage protection circuit may be activated and may disable portions of the power supply. Thus, there may be a further delay introduced in the power supply recovery.

An improved mechanism is therefore desirable to provide for quick power supply recovery following an overload condition.

DETAILED DESCRIPTION

A power supply converts electrical energy received in one form to electrical energy delivered in another form. For example, an AC/DC power supply converts alternating current (AC) energy into direct current (DC) energy, a DC/AC power supply converts DC energy into AC energy, a DC/DC power supply converts DC energy of one form into DC energy of another form, and an AC/AC power supply converts AC energy of one form into AC energy of another form.

A power supply may include several stages each of which may be considered a power supply itself. For example, a power supply may include an AC/AC power supply to step down a line voltage, followed by an AC/DC power supply to provide a DC voltage from the stepped-down line voltage, followed by a DC/DC power supply that provides a regulated output voltage from the DC input voltage, followed by a DC/AC power supply to convert the DC voltage into an AC voltage with a desired frequency. Thus, the term power supply encompasses any single electrical energy conversion mechanism as well as combinations of electrical energy conversion mechanisms.

One type of power supply is a switched mode power supply that switches an input from a power source to charge an energy storage circuit as needed to maintain a substantially constant load voltage or current. Buck and boost supplies are examples of switched mode power supplies. A buck supply steps down the voltage such that the output voltage is less than the input voltage. A boost supply steps up the voltage such that the output voltage is greater than the input voltage. A buck-boost supply is a combination of a buck and a boost supply, and operates in buck mode or boost mode depending on the magnitude of the input voltage.

In a buck switched mode power supply a switch may be closed periodically to connect an inductor to the power source at the input. When the switch is closed, energy from the power source is stored in the inductor. When the switch is opened, the inductor is discharged. As the percentage of time the switch is closed increases more energy is delivered to the output and the output voltage correspondingly increases. Thus, a desired voltage may be maintained at the output.

In many switched mode supplies a pulse-width modulated (PWM) signal drives a switch such as the one described above open and a closed. A PWM signal has a constant frequency but varying duty cycle. Duty cycle is the percentage of time that a signal has a certain value. For example, in a signal that swings from five volts (5V) to zero volts (0V), the duty cycle may be the percentage of the signal period that the signal is above three volts (3V) or may be the percentage of the signal period that the signal is below two volts (2V). For ease of understanding and not by way of limitation, duty cycle in the remainder of this document will refer to the percentage of time a signal is at a high value, or "logic one", in a period. The switching signal in a switched mode power supply is generally but not necessarily in the form of a square wave that cycles between "logic one" and "logic zero".

The implemented logic of the power supply determines whether the switch is closed as a result of a high value or a low value of the switching signal. In some implementations a high value of the switching signal causes the switch to close and thus a short duty cycle causes the switch to remain closed for only a small percentage of the period. In other implementations a low value causes the switch to close and thus a short duty cycle causes the switch to remain closed for a large percentage of the period. For ease of understanding and not by way of limitation, throughout the remainder of this document a high value of the switching signal will be related to a closing of the switch such that a high duty cycle will cause the switch to be closed a high percentage of the period.

A signal representing the voltage across the capacitor at the output of the switched mode power supply is fed back to an error amplifier and compared to a reference voltage. The output of the error amplifier represents the difference between the actual output voltage as represented by the feedback voltage and the desired output voltage as represented by the reference voltage. The output of the error amplifier is used to set the duty cycle of the switching signal. Therefore, if the feedback voltage is greater than the reference voltage a lower duty cycle switching signal is generated, and if the feedback voltage is less than the reference voltage a higher duty cycle switching signal is generated.

In some implementations, the output polarity of the error amplifier may go positive or negative. In other implementations, the output polarity of the error amplifier may be one polarity only, either always positive or always negative.

Figure 1A:
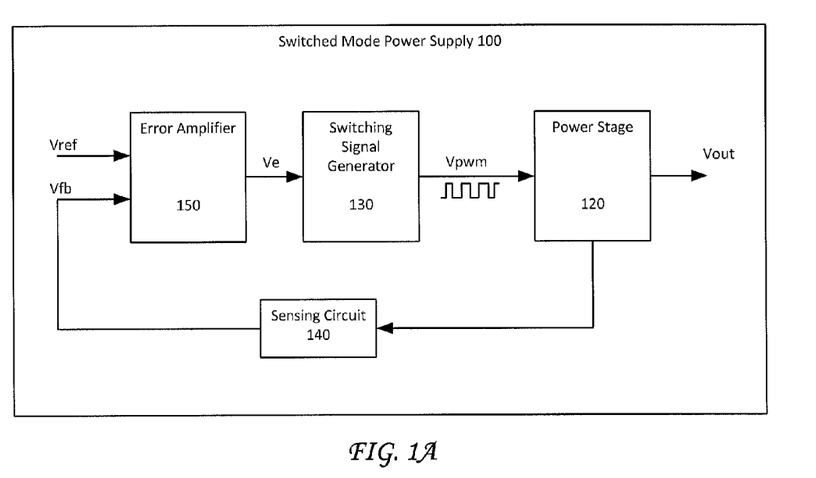
FIG. 1A illustrates a representative switched mode power supply circuit.

FIG. 1A illustrates a representative switched mode power supply 100 in block diagram form, showing some of the functional blocks and signals that may be included in a switched mode power supply. A power stage 120 outputs a voltage Vout as a function of a PWM switching signal generated by a switching signal generator 130. A sensing circuit 140 senses the voltage Vout and provides a feedback signal Vfb representing the voltage Vout to an error amplifier 150. Error amplifier 150 compares feedback signal Vfb to a reference signal Vref and outputs an error signal Ve representing the difference between Vfb and Vref. From error signal Ve, switching signal generator 130 determines the duty cycle for PWM signal Vpwm.

As a load draws power from switched mode power supply 100 at output Vout, the voltage of Vout may decrease. Ve correspondingly increases, the duty cycle of Vpwm increases, and Vout increases. Thus, Vout may be regulated to a substantially constant output voltage.

The functional blocks as shown in FIG. 1A are not a limitation on physical implementation. Switched mode power supply 100 may be implemented with discrete components, with integrated circuits, or with a combination of discrete components and integrated circuits. If the implementation includes one or more integrated circuit devices, the functionality incorporated into the device or devices may be partitioned differently than the functional partitioning of FIG. 1A. An implementation of switched mode power supply 100 may include analog and digital circuitry, and may further include firmware or software.

Figure 1B:
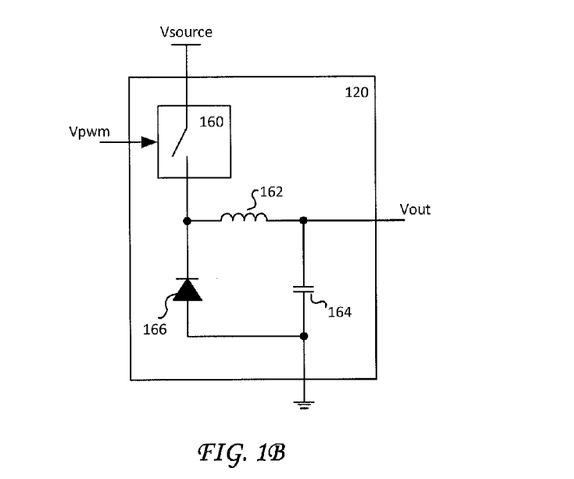
FIG. 1B illustrates representative buck power supply functionality.

FIG. 1B illustrates one example of a power stage 120 that provides buck power supply functionality for switched mode power supply 100. A power source Vsource supplies input power at an input of the switched mode power supply. The PWM signal Vpwm from switching signal generator 130 is provided to a switching mechanism at switch 160. When switch 160 is closed, inductor 162 is connected to Vsource. As current in inductor 162 ramps up, energy is stored in inductor 162. When switch 160 is opened, inductor 162 is connected to ground through a recirculation diode 166. As current in inductor 162 ramps down, energy is discharged to the load connected at Vout. Output capacitor 164 is charged when the current in inductor 162 is higher than the load current, and discharged otherwise.

A buck power stage 120 was described with respect to FIG. 1B. However, power stage 120 could be implemented with other topologies. For example, power stage 120 could be boost or buck-boost.

Diode 166 in the example of FIG. 1B may be implemented as an active switch and may even be implemented with the same type of device used to implement switch 160. Further, switch 160 and thus diode 166 may be implemented, for example, as one or more metal oxide semiconductor field effect transistors (MOSFETs) or other type of transistor.

Capacitor 164 may be implemented as multiple series or parallel capacitors or as an equivalent capacitance.

One or more of the components shown in switched mode power supply 100 may be included in a semiconductor device. In one implementation, components including switching signal generator 130, sensing circuit 140 and error amplifier 150 are included in one semiconductor device, with power stage 120 provided separately.

Figure 2:
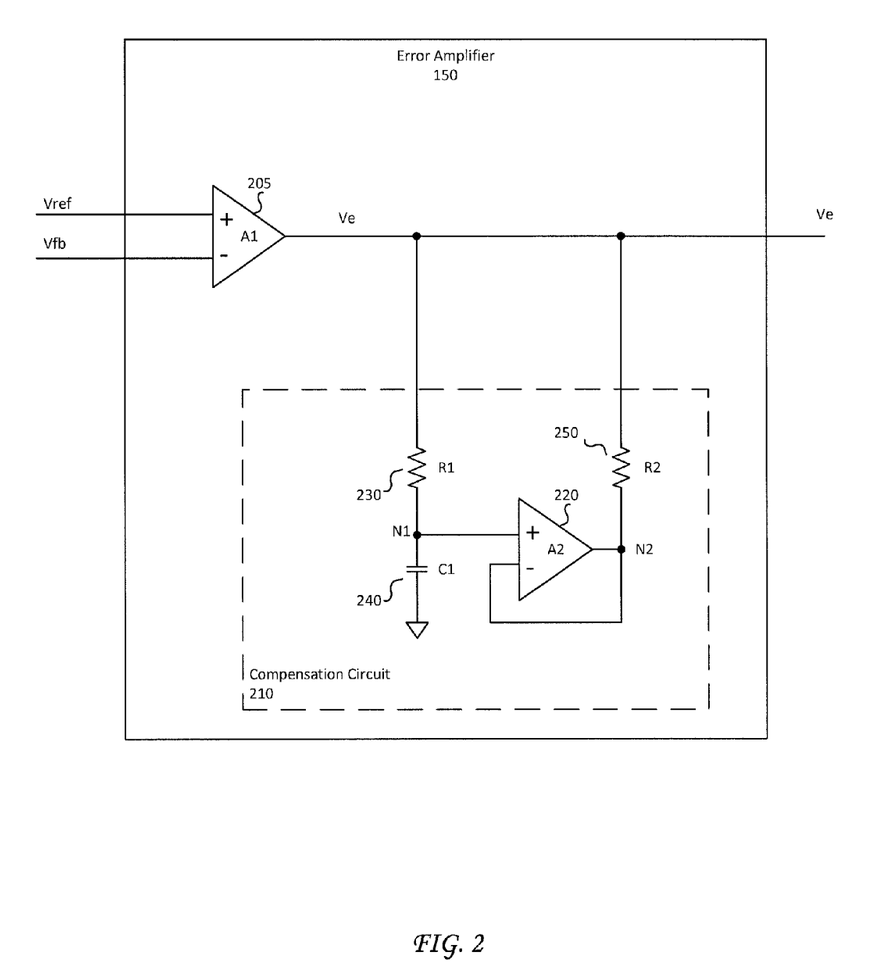
FIG. 2 illustrates a representative error amplifier including a compensation circuit that provides control loop stability through slew rate control.

FIG. 2 illustrates a representative error amplifier 150 including an amplifier 205 (labeled 'A1') and a compensation circuit 210 that provides control loop stability through slew rate control for error amplifier 150 output signal Ve. Slew rate is the rate at which a signal changes value. Control loop stability includes maintaining signal Ve within predefined bounds such that output Vout remains within predefined bounds.

Slew rate is a factor in stability and is separately a factor in the generation of electrical noise. Undesirable electrical noise may be generated when a signal changes, especially with rapidly-changing signals. The undesirable electrical noise may be coupled into the device or into neighboring devices. Thus, the rate of change of a signal may be limited not only to stabilize the control loop, but also to minimize the amount of electrical noise generated.

Amplifier A1 may be a transconductance amplifier that converts voltage information at the inputs into current information at the output. Alternatively, amplifier A1 may by any other amplifier that outputs a signal based on a comparison of two input signals. The amplification factor of A1 contributes to control loop stability. The amplification factor of A1 may be less than or equal to one.

Compensation circuit 210 is shown as one form of a Type-II compensation circuit in which amplifier 220 (labeled 'A2'), resistor 230 (labeled 'R1'), capacitor 240 (labeled 'C1'), and resistor 250 (labeled 'R2') form an active capacitor with output impedance R2 and a zero at the frequency $1/2\pi R1C1$. The non-inverting input of A2 is electrically connected to resistor R1 and capacitor C1 at node N1. The inverting input of A2 is electrically connected to the output of A2 and to resistor R2.

In normal operation, compensation circuit 210 limits the slew rate of difference signal Ve, effectively integrating the feedback signal, thereby integrating out the influence of fast transients at the output and contributing to the stability of the control loop. A fast transient is generally a fast voltage spike or spikes of short duration.

In some situations a fast change in voltage level occurs at the output of the power supply but is not a fast transient. For example, the output voltage of the power supply may increase rapidly and significantly following the end of an overload condition. One example of an overload condition is a short to ground condition. The short to ground examples provided below are used to illustrate how a power supply may respond to an overload condition. During a short circuit to ground condition at the output of the power supply, the feedback signal to amplifier A1 may be nearly zero and signal Ve from amplifier A1 may therefore indicate that a maximum duty cycle switching signal should be generated. When the short circuit to ground condition ends, the output voltage may ramp up very quickly Amplifier A1 attempts to reduce Ve quickly in response but the slew rate limiting of compensation circuit 210 slows down the change in Ve. Because Ve does not change quickly, the switching signal duty cycle remains higher than the output voltage would indicate. Thus, recovery of switched mode power supply 100 is delayed, and extended overshoot of the voltage Vout at the output of the power supply may result. In turn, overshoot of the output voltage may possibly cause an overvoltage protection mechanism to be triggered. To illustrate, the following discussion refers back to FIG. 1A.

When the switched mode power supply 100 output Vout experiences a short circuit to ground, Vout is pulled to approximately zero volts. Sensing circuit 140 senses the approximately zero volts and outputs a signal Vfb representing a value of approximately zero volts. Error amplifier 150 compares Vfb to Vref and determines that Vref is much greater than Vfb, and outputs signal Ve representing the large difference between Vfb and Vref. Switching signal generator 130 interprets signal Ve as a need to provide more charge in power stage 120, thus generator 130 increases the duty cycle of signal Vpwm to a maximum. Thus, current is provided through power stage 120 to ground through the ground short with the switch closed a maximum percentage of the time.

The short to ground condition may be removed at a later time. Depending on the duration of the short to ground condition, the energy storage mechanism of power stage 120 may be fully discharged. When the short to ground condition is removed, voltage Vout jumps to the voltage representing the current energy stored within the energy storage mechanism of power stage 120.

Sensing circuit 140 output Vfb increases to reflect the increased voltage Vout when the short to ground condition is removed. Error amplifier 150 correspondingly attempts to lower amplifier voltage Ve to cause a decreased duty cycle for signal Vpwm. However, compensation circuit 210 (FIG. 2) performs a limiting function as described above, thus limiting the rate of change of signal Ve. With signal Ve rate of change limited, Ve decreases slowly and switching signal Vpwm duty cycle correspondingly decreases slowly. The energy storage mechanism of power stage 120 continues to charge more than necessary, and output voltage Vout exceeds the nominal output voltage for which the power supply was designed. If Vout exceeds an overvoltage threshold then an overvoltage protection circuit may be triggered and, for example, power stage 120 disabled. Whether or not overvoltage protection is triggered, the overshoot of Vout at the end of a short to ground condition is generally undesirable behavior.

There may be causes other than the end of a short circuit to ground for a fast-occurring voltage change at the output of switched mode power supply 100. Further, a short circuit to ground is just one example of an overload condition, wherein the load attempts to draw more current than the power supply can provide. Additionally, an overvoltage condition may occur independently, not caused by the delay introduced by compensation circuit 210.

One solution for minimizing the overshoot described is to allow signal Ve to decrease rapidly following the end of an overload condition.

Figure 3:
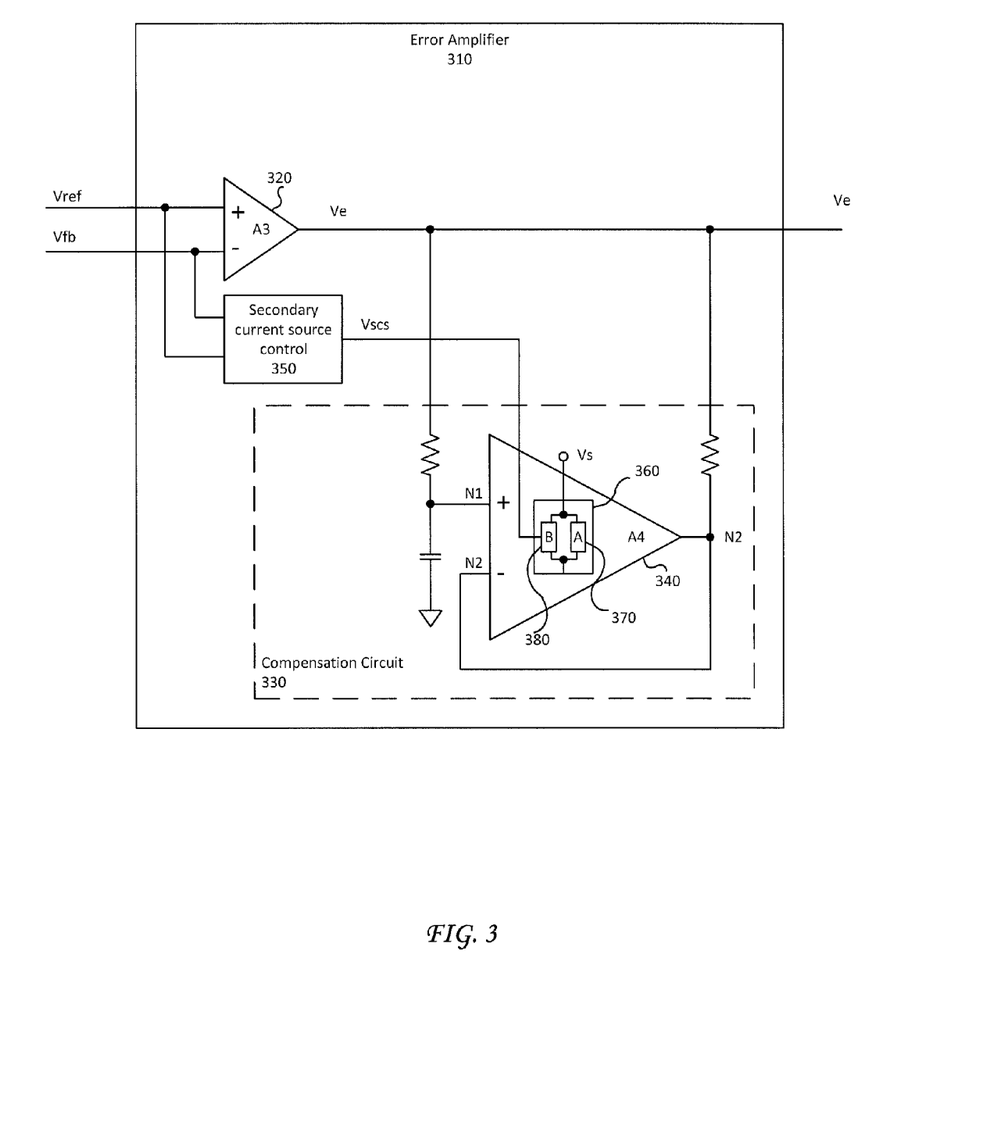
FIG. 3 illustrates an exemplary implementation of an error amplifier including a control signal for modifying a slew rate.

FIG. 3 illustrates an exemplary implementation of an error amplifier 310 including a control signal for modifying the slew rate of signal Ve to allow Ve to decrease rapidly. Error amplifier 310 includes amplifier 320 (labeled 'A3'), compensation circuit 330 including amplifier 340 (labeled 'A4') and various other components, and secondary current source control 350. Amplifier A4 includes a current sourcing mechanism 360 that receives power from a power source Vs and provides operational current for amplifier A4. Current sourcing mechanism 360 includes a primary current source 370 (labeled 'A') and a secondary current source 380 (labeled 'B').

Amplifier A3 performs a function similar to the function described for amplifier A1 in FIG. 2, outputting a signal Ve representative of the difference between signals Vref and Vfb. Compensation circuit 330 performs a function similar to the compensation circuit 210 of FIG. 2, providing for limiting the rate of change of signal Ve. Secondary current source control 350 outputs a signal Vscs that is a function of the difference between signals Vref and Vfb. Secondary current source 380 is enabled and disabled by signal Vscs from secondary current source control 350.

Continuing with the exemplary error amplifier of FIG. 3, during normal switched mode power delivery from switched mode power supply 100, primary current source 370 and secondary current source 380 are both enabled, and the operational current available to amplifier A4 is the sum of the currents from primary and secondary current sources 370 and 380, respectively. However, when switched mode power supply 100 output voltage Vout increases such that feedback signal Vfb exceeds reference signal Vref by a predefined amount, secondary current source control 350 disables secondary current source 380. The operational current available to amplifier A4 is thus limited to the current from primary current source 370.

Amplifier A4 is weaker when supplied only by primary current source 370 and is not able to control the slew rate to the extent possible when supplied by both primary and secondary current sources 370 and 380, respectively. Therefore, signal Ve is allowed to change at a faster rate when amplifier A4 is supplied only by primary current source 370.

As mentioned above, error amplifier 310 may be configured such that secondary current source 380 is disabled when signal Vfb representing output voltage Vout exceeds signal Vref by a predefined amount. Such a predefined amount may be determined based on allowable output voltage Vout tolerance, power supply 100 component tolerances, switching signal Vpwm resolution, and the like. Because the detection occurs within the error amplifier 310 that provides for closed-loop regulation of the output voltage Vout, the difference between Vref and Vfb that indicates an overvoltage condition may be small or even zero. This translates into a lower overvoltage threshold for output Vout and correspondingly quicker overvoltage detection. In comparison, for example, ground offsets and other tolerances between error amplifier 310 and an overvoltage detection circuit external to error amplifier 310 could force an overvoltage detection threshold to be set higher.

Error amplifier 310 not only provides for faster rate of change for signal Ve under certain conditions, but may additionally provide for quick overvoltage detection.

The error amplifier 310 of the example of FIG. 3 is illustrated indicating that secondary current source control 350 evaluates signals Vref and Vfb separately from the evaluation performed by amplifier A3. In some implementations, however, a portion of secondary current source control 350 may be included within amplifier A3 to reduce component count, reduce integrated circuit size, or the like.

Figure 4:
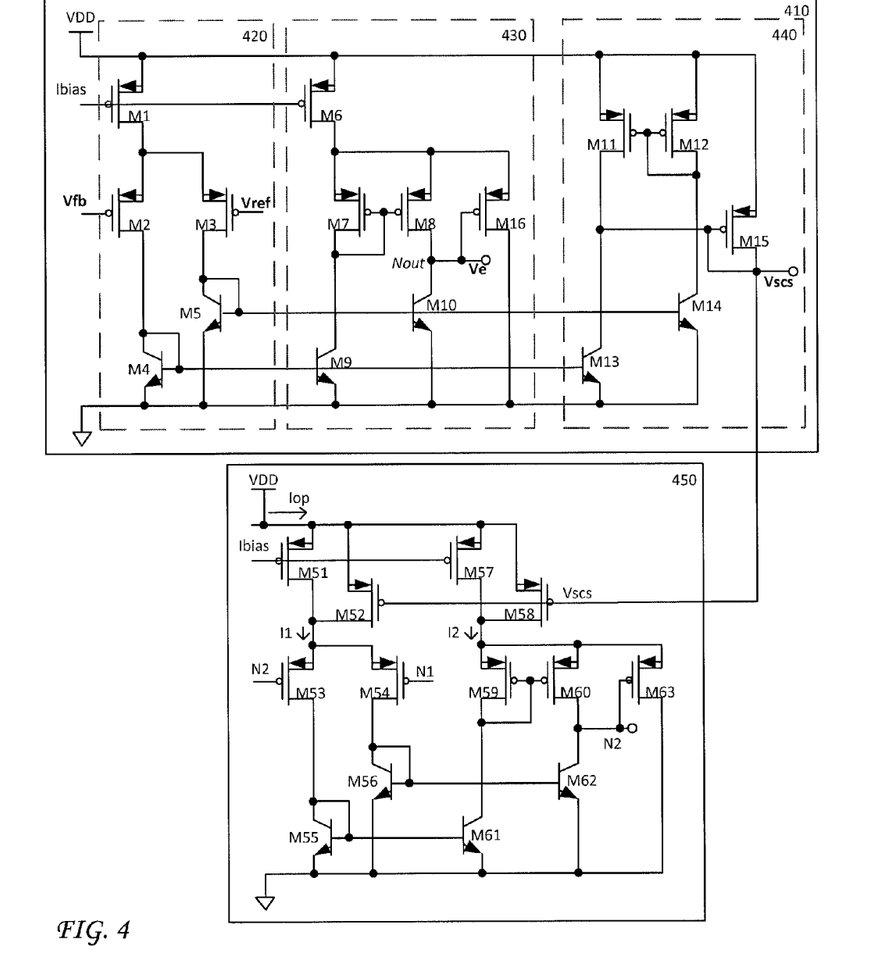
FIG. 4 illustrates an exemplary circuit including an amplifier and a secondary current source control.

FIG. 4 illustrates an exemplary circuit 410 incorporating an amplifier and further incorporating a secondary current source control 350. Also illustrated is a compensation circuit amplifier 450 including primary and secondary current sources. The rest of the compensation circuit is not shown in FIG. 4. The circuit topology illustrated in FIG. 4 is just one example of an implementation of portions of the error amplifier 310 of FIG. 3. Other circuit topologies may alternatively be implemented.

Circuit 410 includes sections 420, 430, and 440. Sections 420 and 430 together implement the functionality of amplifier A3 in FIG. 3. Section 420 is also used in combination with section 440 to implement the functionality of secondary current source control 350 in FIG. 3. Thus, section 420 is shared, thereby increasing accuracy and reducing component count.

Section 420 includes transistors M1-M5; section 430 includes transistors M6-M10; and section 440 includes transistors M11-M15. As is known, a bias current Ibias set from a bandgap voltage is applied to the gates of M1 and M6 causing the respective currents through M1 and M6 to be proportional to each other, the proportionality of the currents based on the proportionality of the geometry of M1 and M6. M1 provides operating current for section 420, and M6 provides operating current for section 430.

Signal Vfb is applied to the gate of M2. If Vfb goes below the turn-on threshold for M2, M2 will conduct current and M4 will conduct a current equal to the current through M2. If Vfb exceeds the turn-on threshold for M2, M2 will be off and conduct no current and M4 correspondingly conducts no current.

Signal Vref is applied to the gate of M3. Vref is a constant voltage. M5 will conduct a current equal to the current through M3.

When the magnitude of Vfb is less than the magnitude of Vref, M2 conducts more current than M3 so M4 conducts more current than M5. Conversely, when the magnitude of Vfb is greater than the magnitude of Vref, M3 conducts more current than M2 so M5 conducts more current than M4.

M4 is constructed similarly to M9. M5 is constructed similarly to M10. The base-emitter voltage of M9 is equal to the base-emitter voltage of M4 and the base-emitter voltage of M10 is equal to the base-emitter voltage of M5. Therefore, M9 is a current mirror of M4 and the current through M9 is equal to the current through M4. Similarly, M10 is a current mirror of M5 and the current through M10 is equal to the current in M5.

M7 is constructed similarly to M8. The gate voltage of M7 is equal to the gate voltage of M8. Thus, M8 is a current mirror for M7 and the current through M8 is equal to the current through M7. The current through M7 is equal to the current through M9.

If the current through M5 is greater than the current through M4, then the current through M10 is correspondingly greater than the current in M9. M8 will not be able to supply the whole current for M10 because it is limited to the current in M9. The difference between the current of M8 and M10 is sunk by section 430 at node Nout. Signal Ve by its polarity reflects the sinking of current.

If the current through M5 is less than the current in M4, then the current through M10 is correspondingly less than the current in M9, and M8 will supply more current than M10 can sink. The difference between the current of M8 and M10 is sourced by section 430 at node Nout. Signal Ve by its polarity reflects the sourcing of current.

Therefore, the amplifier implemented by sections 420 and 430 as illustrated in FIG. 4 is a transconductance amplifier that reflects by the current at Nout the difference between the gate voltages of inverting input M2 and non-inverting input M3.

The analysis for the output of section 440 is similar to the analyses above for section 430. M13 is a current mirror of M4. M14 is a current mirror of M5. M11 is a current mirror of M12. When Vfb is less than Vref, the current through M13 is greater than the current through M14. The current through M11 is equal to the current through M14. M11 cannot provide all the current for M13. The gate voltage for M15 is low enough that M15 conducts and provides the difference between the currents of M11 and M13 (equal to the difference of the currents through M13 and M14) through the drain-gate short of M15.

As Vfb increases above Vref, the current through M14 becomes greater than the current through M13. M11 attempts to source more current than M13 can sink, and Vscs increases. If Vscs increases to the point that the gate voltage of M15 exceeds the turn-on threshold of M15, M15 turns off. In some implementations, circuit 410 is designed so that M15 is off for any value of Vfb greater than Vref.

The gate voltage of M15 (equal to the drain voltage of M15) is a control signal Vscs for the secondary current source of amplifier 450.

Transistor M16 in the illustration of FIG. 4 is included as a current sink for excess current of M6.

Amplifier 450 includes transistors M51-M62 Amplifier 450 is similar to the amplifier of combined sections 420 and 430 and the analysis is similar to that described above. However, one different feature is the addition of M52 and M58 controlled by signal Vscs. Current I1 is the sum of the currents through M51 and M52. I2 is the sum of the currents through M57 and M58. Top is the sum of currents I1 and I2.

When Vfb is less than Vref and M15 is on, M52 and M58 will also be on.

As the gate voltage of M15 begins to increase, the gate voltages of M52 and M58 also increase, and the current through M52 and M58 begins to decrease.

Eventually Vfb increases to the point that the gate voltage of M15 crosses the turn-on threshold and M15 turns off. Correspondingly, the gate voltages of M52 and M58 increase to the point that M52 and M58 turn off and the current M52 and M58 is zero.

Transistor M63 in the illustration of FIG. 4 is included as a current sink for excess current of M57 and M58.

To summarize, when Vfb is less than Vref, M52 and M58 provide current for the operation of amplifier 450 and the total operational current Top is provided by M51, M52, M57, and M58. When Vfb is a predefined amount greater than Vref, M52 and M58 do not provide current for the operation of amplifier 450 and the total operational current is provided only by M51 and M57. In some implementations, M51 and M57 may also be disabled under certain conditions.

Therefore, an overvoltage condition at the output of switched mode power supply 100 will leave the compensation circuit incorporating amplifier 450 less able to provide slew rate limiting. Consequently, a quicker reaction to an overvoltage condition at the power supply 100 output is achieved. Additionally, the components of section 440 may be sized with fine resolution to adjust the threshold at which an overvoltage condition is recognized so that a lower threshold may be achieved.

The exemplary illustration of FIG. 4 does not include information on the absolute or relative sizes of transistors. However, absolute and relative size is important in the design of an error amplifier and may be adjusted according to the requirements of, for example, signal strength of the signal Ve or the signal Vscs. The relative strength of section 430 as compared to amplifier 450 may also be set by sizing certain transistors of the respective circuits. Therefore, transistor sizes provide at least in part for the effectiveness of the slew rate limiting, and for the difference in slew rate limiting when M52 and M58 are switched off.

The transistors of FIG. 4 are illustrated as one particular combination of MOSFETs and bipolar junction (BJT) transistors. However, the error amplifier of FIG. 4 may be implemented using many other combinations of MOSFETs, BJTs, or other transistor types.

Figure 5:
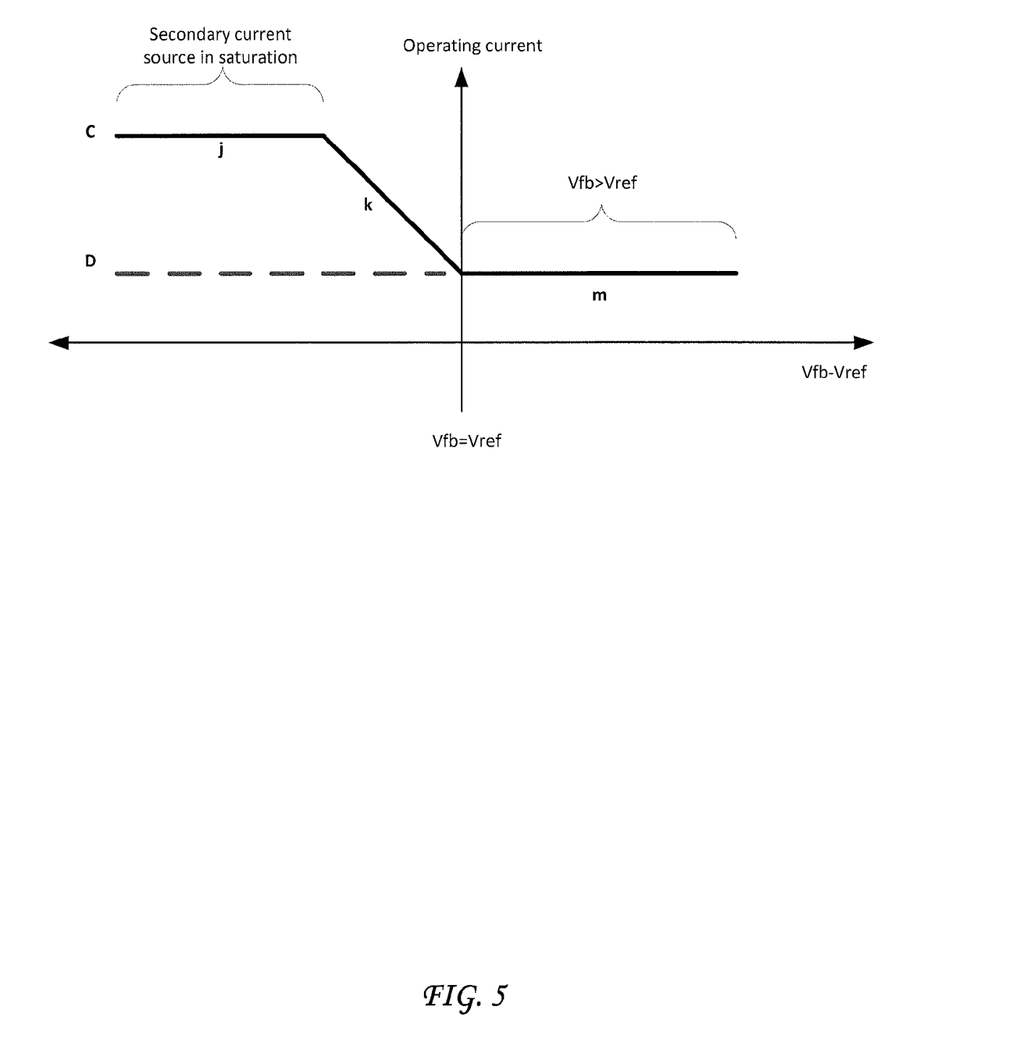
FIG. 5 is a plot of total operational current for an amplifier versus the difference between a reference voltage and a feedback voltage.

FIG. 5 is a plot of total operational current for an amplifier (such as amplifier 450 of FIG. 4) versus the difference Vfb-Vref at the inputs of an amplifier (such as the amplifier of sections 420 and 430 of FIG. 4.) For ease of illustration, the example of FIG. 5 is based on the circuit of FIG. 4 being designed such that the secondary current source is fully off when the feedback signal Vfb is equal to the reference signal Vref. Other designs are also possible wherein the secondary current source is not fully off until Vfb exceeds Vref by a predefined amount, or wherein the secondary current source is fully off when Vfb is a predefined amount less than Vref.

On the plot in FIG. 5, trace 'C' represents the operating current of an amplifier in a compensation circuit, such as amplifier 450 of FIG. 4. Sections T and 'k' of trace 'C' represent normal operation of the amplifier. When the secondary current source transistors such as M52 and M58 are on and in saturation mode, operating current Iop remains a constant value, as illustrated by section T of trace 'C'. As feedback signal Vfb increases, the secondary source transistors M52 and M58 conduct less current and operating current Top begins to decrease, as illustrated by section 'k' of trace 'C'. When Vfb is equal to Vref, the secondary current source is fully off and only the primary current source, such as transistors M51 and M57 in FIG. 4, is active. When Vfb exceeds Vref, as illustrated by section 'm' of trace 'C', only the primary current source is active. Trace 'D' illustrates that for this implementation the primary current source is always operational and only the secondary current source is adjusted based on the difference Vfb-Vref.

Not shown on the plot in FIG. 5 is the operating current of the amplifier of sections 420 and 430. In some implementations, the amplifier of sections 420 and 430 is designed with operating current equal to the current of trace 'C' on the plot of FIG. 5 such that the amplifier has the same strength as amplifier 450 in normal operation. However, in other implementations it may be advantageous to design sections 420 and 430 with operating current at a higher or lower level than Top of amplifier 450.

There are many implementations of the error amplifier of FIG. 3 other than the implementation illustrated in FIG. 4 and further described by the plot in FIG. 5. For example, the operating current Top of the amplifier in the compensation circuit may be fully shut off under certain conditions. There may be multiple detection mechanisms such as multiple sections 440 of FIG. 4, wherein each detection mechanism outputs a different signal based on the difference between signals Vfb and Vref. Further, an output of a section 440 illustrated in FIG. 4 may be used to control various functions of power supply 100 such as disconnecting the power stage 120 of FIG. 1A from the load.

CONCLUSION

The output voltage of a switched mode power supply is monitored. Based on the difference between a reference signal and a feedback signal representing the output voltage, an error amplifier provides a control signal that may be used to adjust slew rate limiting capability in a compensation circuit of the error amplifier. Thus, a fast voltage change or overvoltage condition at the output of the switched mode power supply may be quickly detected and quick reaction may be possible. Further, an overvoltage detection threshold in the error amplifier may be set at a level lower than is possible for an overvoltage detection threshold in a circuit external to the error amplifier.

Another advantage of overvoltage detection included in the error amplifier may be fewer components and smaller circuit size.

What is claimed is:

1. An SMPS (switched mode power supply) controller operable in a switching converter including an energy storage inductor coupled between a power source and a load, and including a transistor switch coupled to the inductor at a switch node, the switching converter being controlled to supply a regulated voltage from the power source to the load by controlling a switching duty cycle of the transistor switch, comprising:
a switching signal generator coupled to, or configured to couple to, the transistor switch, and configured to provide a switching signal to the transistor switch with a switching duty cycle based in part on a difference signal;
an error amplifier including
a first input receiving a reference signal having a voltage; and
a second input receiving a feedback signal having a voltage representing the load voltage;
the error amplifier configured to provide the difference signal representing a difference between the reference signal and the feedback signal; and
a compensation circuit electrically connected to an output of the error amplifier, and configured to provide slew rate control for the difference signal output from the error amplifier, the compensation circuit including:
a control circuit configured to provide a control signal generated as a function of the difference between the reference signal and the feedback signal; and
a compensation amplifier configured to adjust the slew rate of the difference signal output from the error amplifier, the compensation amplifier responsive to the control signal to adjust an operating current of the compensation amplifier, and thereby correspondingly adjust the slew rate of the difference signal.

2. The SMPS controller of claim 1, the compensation amplifier comprising a primary current source and a secondary current source, the operating current of the compensation amplifier being the sum of a current from the primary current source and a current from the secondary current source.

3. The SMPS controller of claim 2, the operating current of the compensation amplifier being adjusted by adjusting the current provided by the secondary current source.

4. The SMPS controller of claim 3, the current of the secondary current source being adjusted by controlling the gate voltage of at least one transistor in the compensation amplifier.

5. The SMPS controller of claim 4, the gate voltage of the at least one transistor in the compensation amplifier being the turn-on voltage of the transistor when the feedback signal voltage is substantially equal to the reference signal voltage.

6. The SMPS controller of claim 1, the error amplifier developing a reference current representing the reference voltage and a developing feedback current representing the feedback voltage, the control circuit including a current mirror circuit that mirrors the reference current and the feedback current.

7. The SMPS controller of claim 6, the control circuit generating the control signal based at least in part on the mirrored reference current and mirrored feedback current.

8. The SMPS controller of claim 1, the error amplifier configured such that the difference signal is greater than or equal to zero.

9. The SMPS controller of claim 1, the control signal disabling a switching circuit.

10. A method employable in an SMPS (switched mode power supply) to control a switching converter including an energy storage inductor coupled between a power source and a load, and including a transistor switch coupled to the inductor at a switch node, the switching converter being controlled to supply a regulated voltage from the power source to the load by controlling a switching duty cycle of the transistor switch, comprising:
in an error amplifier,
receiving at a first input a reference signal having a voltage;
receiving at a second input a feedback signal having a voltage representing the amplitude of a load voltage;
providing at an output a difference signal representing a difference between the reference signal and the feedback signal, the difference signal controlling the switching duty cycle of the transistor switch;

in a compensation circuit including a compensation amplifier and configured to provide slew rate control for the difference signal output from the error amplifier, generating a control signal as a function of the difference between the reference signal and the feedback signal; and adjusting an operating current of the compensation amplifier based on the control signal, and thereby correspondingly adjusting the slew rate of the difference signal.

11. The method of claim 10, the compensation amplifier comprising a primary current source and a secondary current source, the operating current of the compensation amplifier being the sum of a current from the primary current source and a current from the secondary current source.

12. The method of claim 11, adjusting the operating current of the compensation amplifier being adjusting the current provided by the secondary current source.

13. The method of claim 12, adjusting the current provided by the secondary current source being controlling the gate voltage of at least one transistor in the compensation amplifier.

14. The method of claim 13, controlling the gate voltage of the at least one transistor in the compensation amplifier being setting the gate voltage of the at least one transistor to be the turn-on voltage of the at least one transistor when the feedback signal voltage is substantially equal to the reference signal voltage.

15. The method of claim 10, further comprising:
in the error amplifier
developing a reference current representing the reference voltage;
developing a feedback current representing the feedback voltage;
mirroring the reference current; and
mirroring the feedback current;
the generating the control signal being based at least in part on the mirroring of the reference current and the mirroring of the feedback current.

16. The method of claim 10, the difference signal being greater than or equal to zero.

17. The method of claim 10, the control signal disabling a switching circuit.

18. A switched mode power supply, comprising:
an energy storage inductor coupled between a power source and a load;
a transistor switch coupled to the inductor at a switch node,
a switching converter circuit configured to supply a regulated voltage from the power source to the load by controlling a switching duty cycle of the transistor switch;
a switching signal generator coupled to the transistor switch, and configured to provide a switching signal to the transistor switch with a switching duty cycle based in part on a difference signal;
a sensing circuit providing a feedback signal representing the load voltage;
an error amplification circuit including
an error amplifier that compares the feedback signal to a reference signal and provides the difference signal based on the comparison; and
a compensation circuit electrically connected to an output of the error amplifier, and configured to provide slew rate control for the difference signal output from the error amplifier, the compensation circuit including
a control circuit that generates a control signal based at least in part on the feedback signal and the reference signal; and
a compensation amplifier configured to adjust the slew rate of the difference signal output from the error amplifier, the compensation amplifier responsive to the control signal to adjust an operating current of the compensation amplifier, and thereby correspondingly adjust the slew rate of the difference signal.

19. The switched mode power supply of claim 18, the compensation amplifier comprising a primary current source and a secondary current source, the operating current of the compensation amplifier being the sum of a current from the primary current source and a current from the secondary current source.

20. The switched mode power supply of claim 19, the operating current of the compensation amplifier being adjusted by adjusting the current provided by the secondary current source.

21. The switched mode power supply of claim 20, the current of the secondary current source being adjusted by controlling the gate voltage of at least one transistor in the compensation amplifier.

22. The switched mode power supply of claim 21, the gate voltage of the at least one transistor in the compensation amplifier being the turn-on voltage of the transistor when the feedback signal voltage is substantially equal to the reference signal voltage.

23. The switched mode power supply of claim 18, the error amplifier configured such that the difference signal is greater than or equal to zero.

24. The switched mode power supply of claim 18, the compensation circuit configured to be an active capacitance.

* * * * *